United States Patent [19]
Mulligan

[11] Patent Number: 5,852,924
[45] Date of Patent: Dec. 29, 1998

[54] METHOD AND APPARATUS FOR MAKING A TAPERED LINE FROM THREAD AND AN IMPROVED TAPERED LINE

[75] Inventor: David Charles Mulligan, Olympia, Wash.

[73] Assignee: Charles Raymond Downey, Lacey, Wash.

[21] Appl. No.: 844,399

[22] Filed: Apr. 18, 1997

[51] Int. Cl.[6] ............................................ D01H 7/02
[52] U.S. Cl. ............................ 57/25; 57/1 R; 57/26; 57/59; 57/60
[58] Field of Search ........................... 57/1 R, 25, 26, 57/27, 59, 60, 64

[56] References Cited

U.S. PATENT DOCUMENTS

| | | | |
|---|---|---|---|
| 730,516 | 6/1903 | Culver | 57/26 |
| 1,275,103 | 8/1918 | Swanson | 57/25 |
| 1,430,519 | 9/1922 | Cattoor | 57/25 |
| 3,704,578 | 12/1972 | Myers | 57/1 R |
| 5,207,732 | 5/1993 | Stark | 43/44.98 |
| 5,517,813 | 5/1996 | Klundt | 57/25 |
| 5,540,990 | 7/1996 | Cook | 428/364 |

*Primary Examiner*—William Stryjewski
*Attorney, Agent, or Firm*—Delbert J. Barnard

[57] ABSTRACT

Thread is wound between spin hooks (20) and anchor hooks (26) and around loop-pins (TP, BP) to form two thread groups, one extending between a first spin hook (20) and the anchor hook (26) and the other extending between the anchor hook (26) and the second spin hook (20). The spin hooks (20) are both rotated in the same direction, at the same speed, for separately twisting the two thread groups. Then, the two separately wound thread groups are moved laterally together and allowed to unwind and at the same time wind together in the opposite direction, to form a single fly fishing leader, or the like. The thread is wound to form twelve thread strands in a butt section of the leader, ten thread strands in a mid-section of the leader and eight thread strands in a tip section of the leader (FIG. 11). As a result, the leader that is formed tapers from the butt end to the tip end.

19 Claims, 6 Drawing Sheets

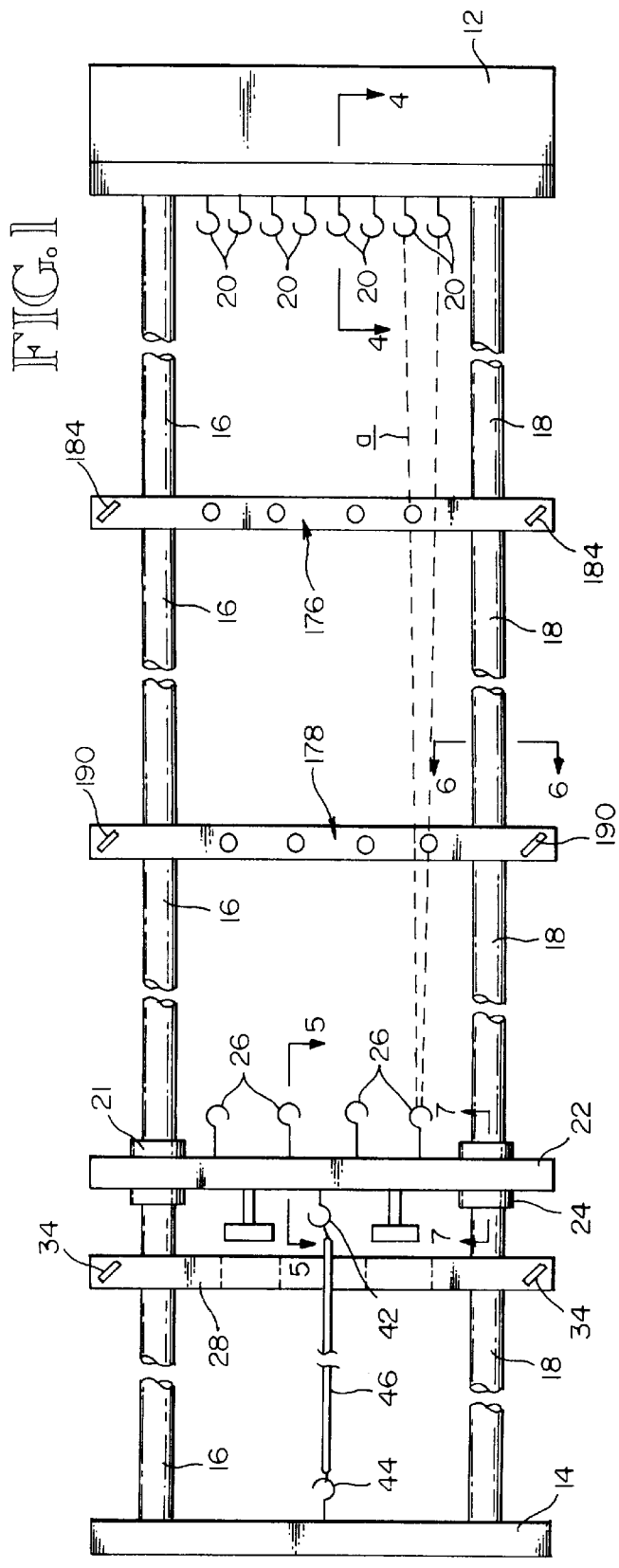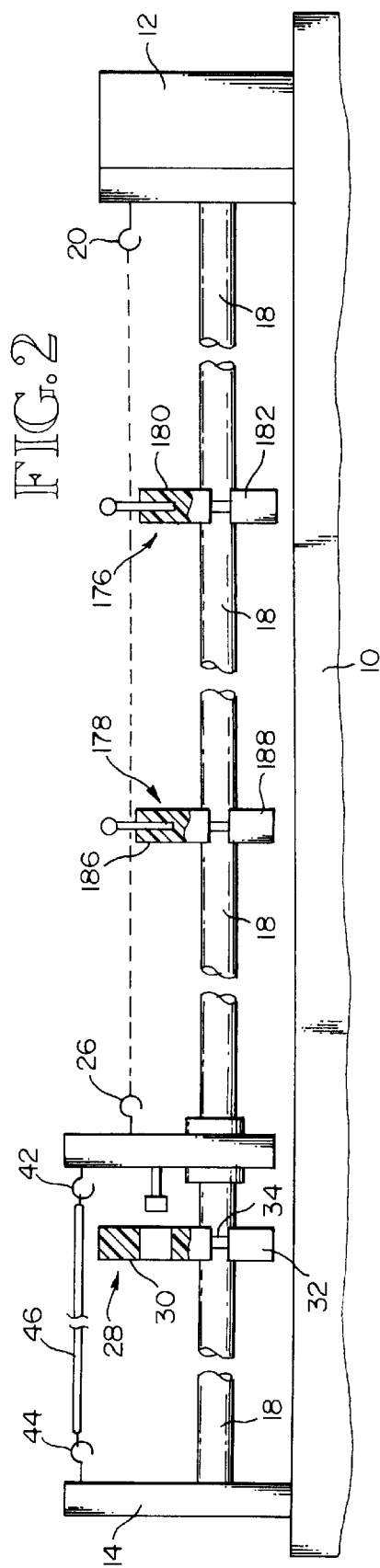

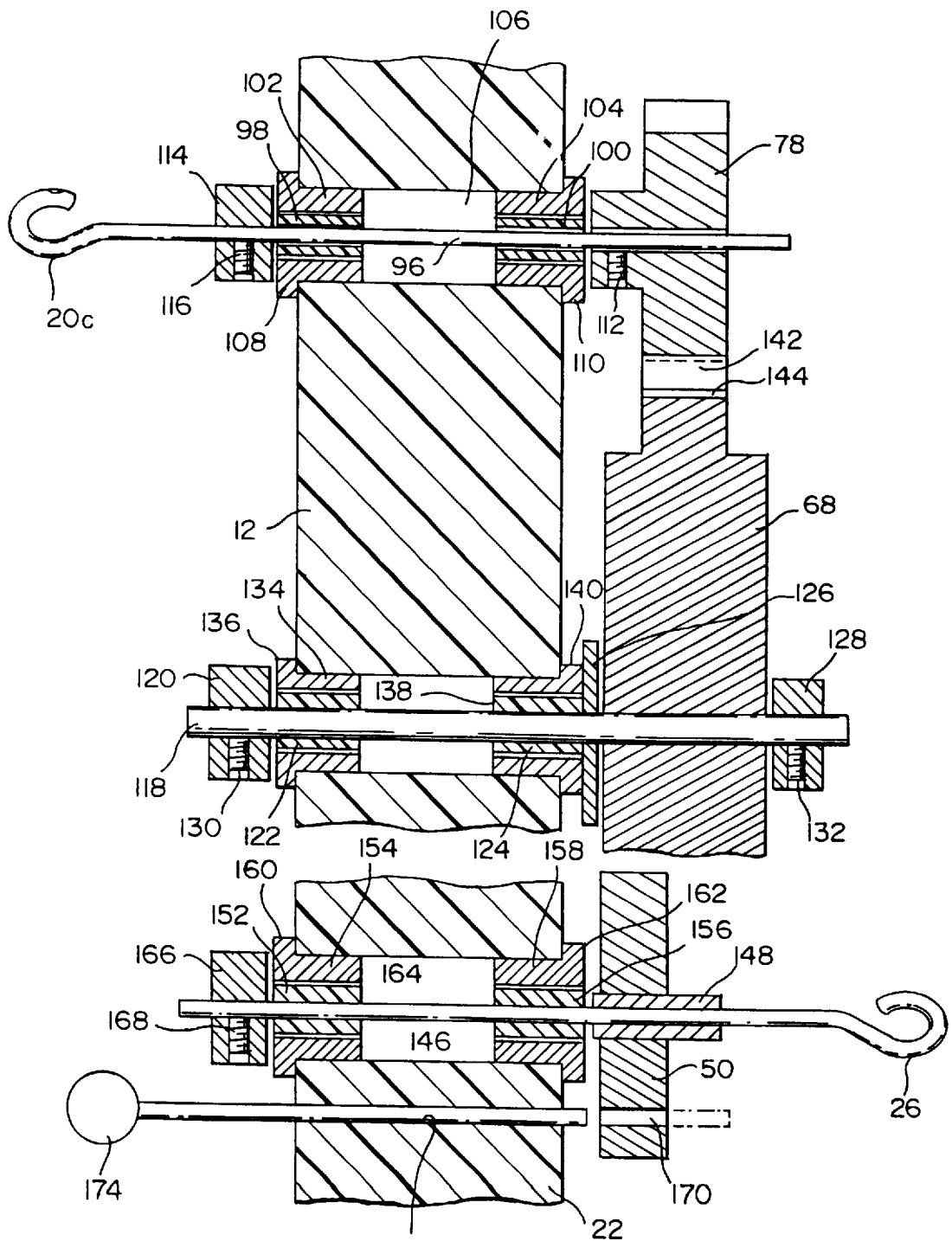

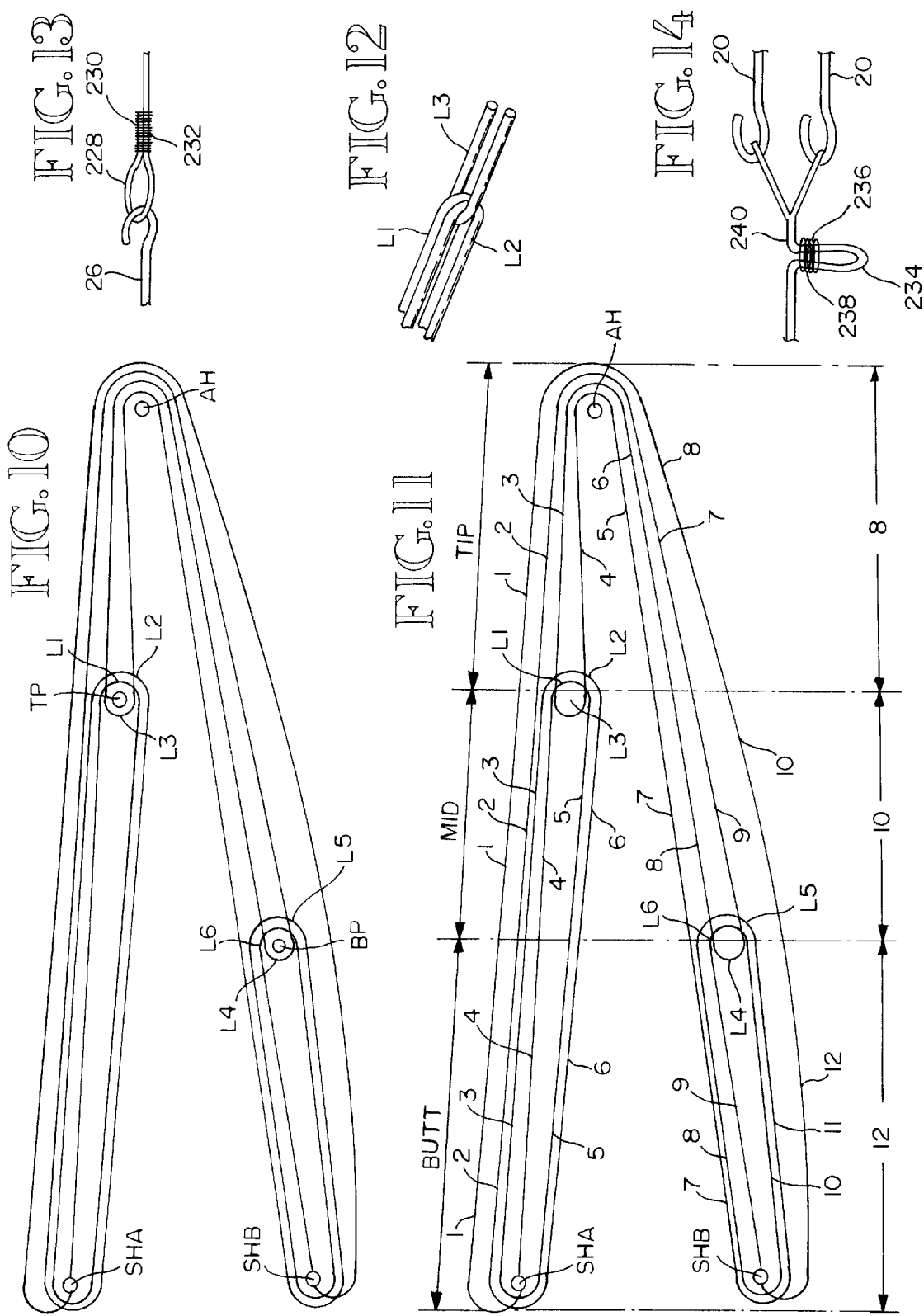

METHOD AND APPARATUS FOR MAKING A TAPERED LINE FROM THREAD AND AN IMPROVED TAPERED LINE

TECHNICAL FIELD

This invention relates to a method and apparatus for making a tapered line from thread and, more particularly, to a method and apparatus for making a tapered fly fishing leader, or the like, by furling.

BACKGROUND OF THE INVENTION

In the sport of fly fishing, it is usual practice for the angler to attach a thin leader to the end of a thicker fly line and then attach a thinner line, called a tippet, to the end of the leader. The fly is attached to the end of the tippet. The leader is an extension of the fly line. It must transfer the energy of the line to the light tippet and the small fly. It is desirable that the leader be capable of carrying the fly out to the end of the cast without striking or slapping the water as it drops into the water. It is desirable that the leader parachute softly into the water so that it does not startle any fish that might be present to take an interest in the fly. A supple leader that makes a soft descent is desirable.

Tapered fly fishing leaders are common and popular. Examples of tapered fly fishing leaders in the patent literature are disclosed by U.S. Pat. No. 5,296,292, granted Mar. 22, 1994, to Leslie C. Butters, and U.S. Pat. No. 5,469,652, granted Nov. 28, 1995, to Joseph Drosdak. "Furled" fly fishing leaders, believed to have originated in Europe, have desirable flight characteristics. They are supple and have a soft descent. There is a need for a furling method that is easy to practice, and for a furling apparatus that is easy to use, for producing high quality furled fly fishing leaders with a desired taper, elasticity, drag and ability to extend effortlessly and descend softly. An object of this invention is to provide such a method and apparatus for making tapered fly fishing leaders by furling.

DISCLOSURE OF THE INVENTION

The apparatus of the present invention is basically characterized by a base, a spin hook support on the base, and at least one pair of adjacent spin hooks on the spin hook support, mounted for rotation about parallel, generally horizontal axes. A drive mechanism is connected to rotate the two spin hooks for simultaneous, same-direction, and substantially same-rate rotation. An anchor hook support is provided on the base, spaced longitudinally from the spin hook support. An anchor hook on the anchor hook support is mounted for rotation about an axis that is parallel to the axis or rotation of the two spin hooks. The anchor hook faces the two spin hooks. The spin hooks and the anchor hook together form the three corners of a triangle. A releasable lock is provided for locking the anchor hook against rotation relative to the anchor hook support. The lock has a lock position in which it engages the anchor hook and holds it against rotation, and a release position in which it allows the anchor hook to rotate freely about its axis of rotation. A first loop-pin support is connected to the base and is spaced longitudinally from the spin hook support, towards the anchor hook support. A second loop-pin support is connected to the base and positioned longitudinally between the spin hook support and the first loop-pin support. A first thread engaging loop-pin is removably mounted on the first loop-pin support, generally in line between a first of said pair of spin hooks and the anchor hook. A second thread engaging loop-pin is removably mounted on the second loop-pin support, generally in line between the second spin hook and the anchor hook. The anchor hook support is mounted on the base for longitudinal sliding movement towards and away from the spin hook support. A spring is connected to the base and to the anchor hook support and is positioned to in use exert a resilient force on the anchor hook support, for biasing it away from the spin hook support. The anchor hook support is movable longitudinally towards the spin hook support, against the force of the spring.

According to one aspect of the invention, the drive mechanism is power driven. However, the drive mechanism may also be manual as well.

According to an aspect of the invention, there are a plurality of pairs of spin hooks on the spin hook support and there are a plurality of anchor hooks on the anchor hook support, one for each pair of spin hooks. Each pair of spin hooks and the associated anchor hook form the corners of a triangle.

According to another aspect of the invention, the base includes a pair of laterally spaced apart tracks. The anchor hook support is mounted on the tracks for longitudinal movement towards and away from the spin hook support. The first and second loop-pin supports are adjustably affixable in longitudinal position on the tracks. The tracks may be tubes and the anchor hook support and the first and second loop-pin supports may include releasably clamps for clamping them to said tubes.

According to a further aspect of the invention, a releasable lock is provided for the anchor hook support. The releasable lock has a lock position in which the anchor hook support is locked in position relative to the spin hook support and a release position in which the anchor hook support is free to move on the base longitudinally towards and away from the spin hook support. The releasable lock for the anchor hook support may include a clamp base mounted on the track tubes and clamps for clamping the clamp base to the tubes. Additional clamps may be carried by the clamp base and the anchor hook support for clamping the anchor hook support to the clamp base when the clamp base is clamped to the track tubes. In this manner, the anchor hook support is locked in position relative to the spin hook support.

According to a method aspect of the invention, a thread is strung back and forth between the spin hooks and the anchor hook and around the loop-pins, to form a first thread group extending between a first spin hook and the anchor hook, and around the first loop-pin, and a second thread group extending between the second spin hook and the anchor hook and around the second loop-pin. The first thread group includes interconnected loops of thread joined at the first loop-pin. The second thread group includes interconnected loops of thread joined at the second loop-pin. The thread groups provide a first number of thread strands extending between the spin hooks and the loop-pin closest to the spin hooks, a second, smaller number of thread strands in the thread extent between the two loop-pins, and a third, yet smaller number of thread strands extending between the loop-pin closest to the anchor hook and the anchor hook. Following the stringing, the loop-pins are removed and a spring force is applied to the anchor hook, to bias the anchor hook away from the spin hooks and tension the thread. Then, the two thread groups are spun in the same direction to separately twist the two thread groups, and cause the thread groups to be shortened by the twisting and to pull on the anchor hook and move it towards the spin hooks, in opposition to the spring force. Following the separate twisting of the two thread groups, the two thread groups are brought together laterally while maintaining tension. Then, the anchor hook is allowed to spin so that the two thread groups will twist and wind together into a single line. Then, the twisted thread strands are secured together at the anchor hook end of the line, to hold the twist. An end loop is formed at the anchor hook end of the line. The twisted thread strands are secured together at the spin hook end of the line, to hold the twist and prevent unwinding. An end loop is then formed at the spin hook end of the line.

In preferred form, the thread is strung to form two loops extending between the first spin hook and the first loop-pin and to form another two loops extending between the second spin hook and the second loop-pin. The thread is strung to extend from the first spin hook to and around the anchor hook and then on to the second spin hook. A loop is formed that engages the first two loops at the location of the first loop-pin. The thread is strung from the two loops at the first loop-pin, to and around the anchor hook and then to the second loop-pin. At the second loop-pin the thread is looped through the second two loops at the second loop-pin.

These and other advantages, objects and features will become apparent from the following best mode description, the accompanying drawings, and the claims, which are all incorporated herein as part of the disclosure of the invention.

BRIEF DESCRIPTION OF THE DRAWINGS

Like reference numerals are used to designate like parts throughout the various views of the drawing, and:

FIG. 1 is a top plan view of an apparatus for forming tapered fly fishing leaders, in such view guide tubes and a spring are broken away for the purpose of indicating indeterminate length and the base of the apparatus;

FIG. 2 is a side elevational view of the apparatus shown by FIG. 1, with some parts fragmented and some parts shown in section;

FIG. 4 is a fragmentary sectional view taken substantially along the line 4—4 of FIG. 1;

FIG. 5 is a fragmentary sectional view taken substantially along 5—5 of FIG. 1;

FIG. 10 is a plan view of a single thread strung on two spin hooks, on two loop-forming pins and on a single anchor hook, such view showing the loop-forming pins;

FIG. 11 is a view like FIG. 10 but with the loop-forming pins removed; and

FIG. 12 is a fragmentary pictorial view at one of the loop connection regions;

FIG. 13 is a fragmentary end view of the anchor hook end of the furled line, showing a binding thread applied to prevent the line from unwinding at such end; and FIG. 14 is a fragmentary view at the spin hook end of the furled line, showing a side loop being formed in the line and a binding thread being applied to secure the loop and prevent the spin hook end of the line from unwinding.

BEST MODE FOR CARRYING OUT THE INVENTION

Figure 3:
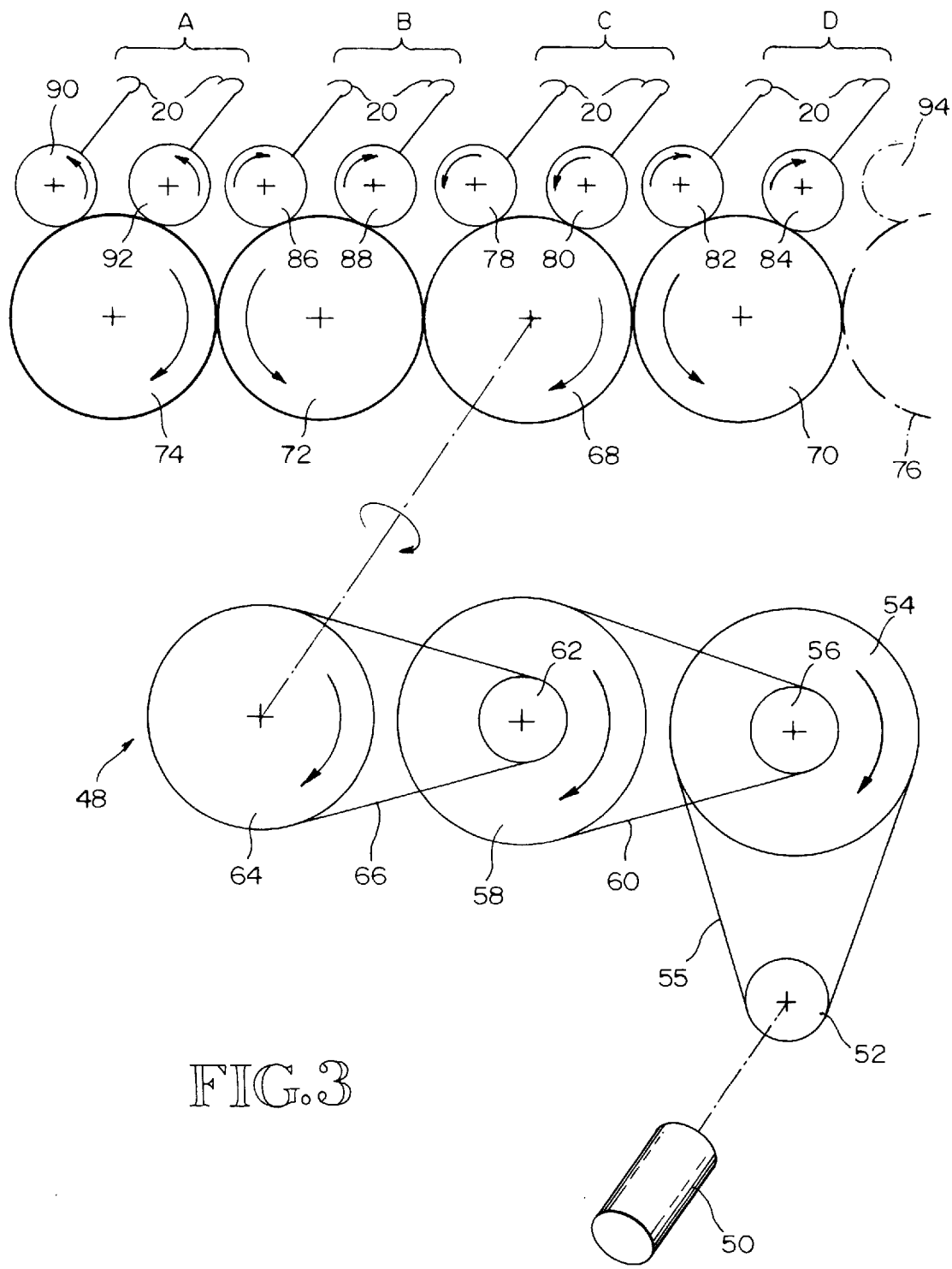
FIG. 3 is a diagram of a drive mechanism for rotating pairs of spin hooks.

Referring to FIGS. 1 and 2, in the illustrated example embodiment, the furling apparatus of the present invention comprises a base 10 having a spin hook support 12 at a first end and a spring support 14 at a second end, both occupying fixed positions on the support 10. The support 10 may comprise longitudinal tracks and the tracks may be in the form of a pair of longitudinally extending, laterally spaced apart tubes 16, 18. In FIGS. 1 and 2, the tubes 16, 18 are broken away at several locations to indicate indeterminate length. Tubes 16, 18 are connected at their ends to the supports 12, 14. As shown by FIG. 2, tubes 16, 18 are elevated above the base 10. Intermediate supports (not shown) may be provided between the ends of the tubes. The purpose of the intermediate supports would be to prevent the central regions of the tubes 16, 18 from sagging.

The spin hook support 12 supports at least one pair of adjacent spin hooks 20. These spin hooks 20 are mounted on the support 12 for rotation about parallel, generally horizontal axes. In the preferred embodiment, the spin hook support 12 mounts a plurality of pairs of spin hooks 20. By way of typical and therefore nonlimitive example, FIG. 1 shows four pairs of spin hooks 20. As a second example, the apparatus could be three times as wide and include twelve pairs of spin hooks 20.

Figure 7:
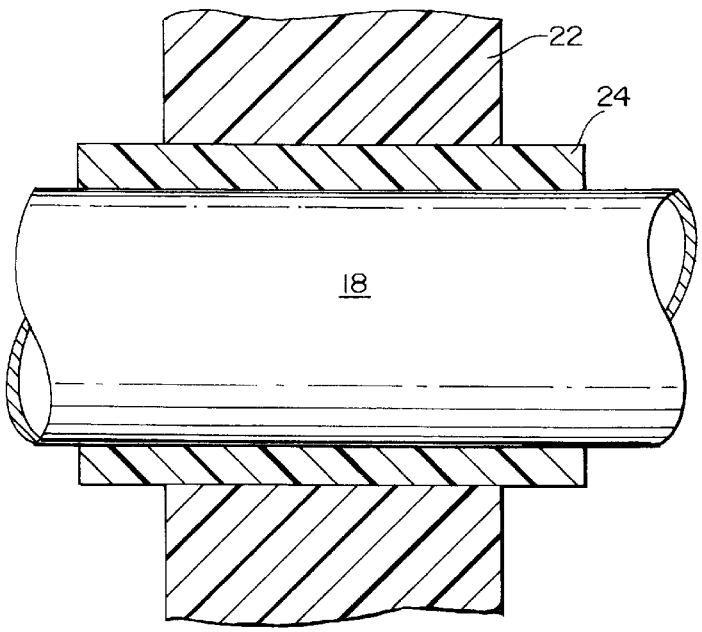
FIG. 7 is a fragmentary sectional view taken substantially along line 7—7 of FIG. 1.

The furling apparatus also includes an anchor hook support 22 that is mounted for longitudinal movement on the tubes 16, 18, such as by elongated sleeve bearings 24 (FIG. 7). The sleeve bearings 24 also brace the anchor hook support 22 so that it remains substantially perpendicular to the tubes 16, 18 as it moves back and forth along the tubes 16, 18. Anchor hook support 22 mounts a plurality of anchor hooks 26, one for each pair of spin hooks 20. As shown in FIG. 1, the spin hooks and the anchor hooks 26 face each other. Each anchor hook 26 is positioned laterally between its pair of spin hooks 20. Each anchor hook 26 and its pair of spin hooks 20 form the corners of a triangle. An example triangle a is shown by broken lines in FIG. 1.

Figure 8:
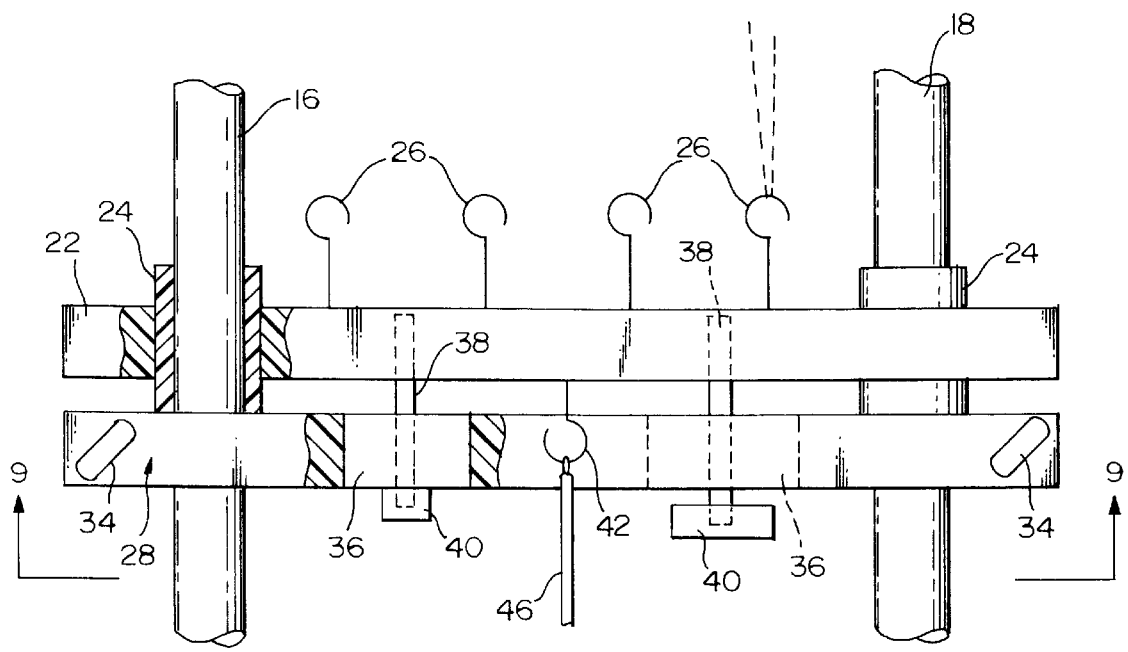
FIG. 8 is a fragmentary top plan view, taken from the aspect of line 8—8 in FIG. 9.
Figure 9:
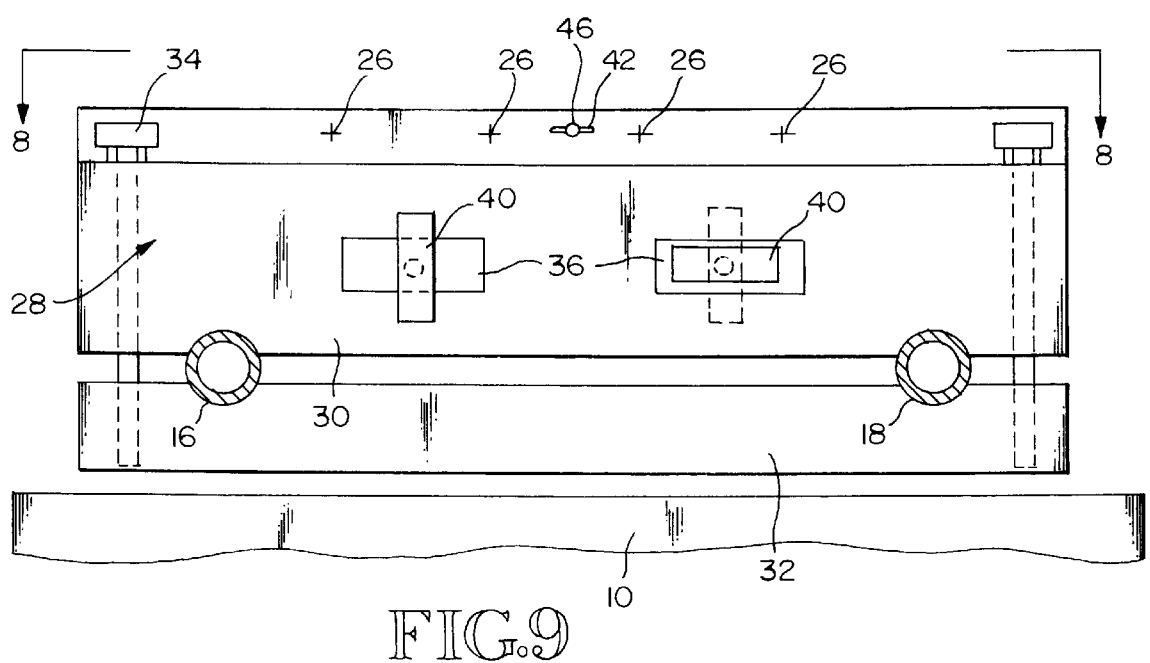
FIG. 9 is a sectional view taken substantially along line 9—9 of FIG. 8.

The furling apparatus includes a way of at times anchoring the anchor hook support 24 against longitudinal movement along the tubes 16, 18. In the preferred embodiment, a clamp base 28 is provided. Clamp base 28 has an upper portion 30, situated above the tubes 16, 18, and a lower portion 32 situated below the tubes 16, 18. The tubes 16, 18 fit into circular grooves formed in the members 30, 32. Clamp screws 34, one at each end of the clamp base 28, connect the upper and lower portions 30,32 together and clamps them to the tubes 16, 18. When the clamp screws 34 are tightened, the clamp base 28 is locked in position on the tubes 16, 18. As best shown by FIGS. 8 and 9, the clamp base 28 is formed to include a pair of laterally spaced apart openings 36 in the upper portion 30. The openings 36 are generally rectangular in shape. A pair of clamp screws 38 are connected to the anchor hook support 22. Clamp screws 38 extend longitudinally of the furling apparatus from the anchor hook support 22 to and through the openings 36. The end portions of the clamp screws 38 are threaded. Clamp nuts 40 are threaded onto the threaded end portions of the clamp screws 38. Referring to FIG. 9, when the clamp nuts 40 are oriented to each pass through an opening 36, the anchor hook support 22 can be moved along tubes 16, 18 towards and away from the clamp base 22. When it is desired to secure the anchor hook support 22 in place, the clamp base 22 is clamped to the tubes 16, 18. The anchor hook support 22 is moved into contact with the clamp base 28. This moves the clamp nuts 40 through the openings 36 and places them on the side of clamp base 28 that is opposite the anchor hook support 22. Then, the clamp nuts 40 are rotated to move them towards and against the clamp base 28. Clamp nuts 40 are rotated until they are tightened on the clamp screws 38 and extend crosswise of the openings 36. This position is shown on the left in FIG. 9. On the right in FIG. 9, the clamp nut 40 is shown to be aligned with the opening 36. Thus, clamp base 28 is clamped to the tubes 16, 18 by a tightening of the clamp screws 34. Then, the anchor hook base 22 is clamped to the clamp base 28 by use of the clamp screws 38.

In the disclosed embodiment, a first spring hook 42 is provided on the anchor hook support 22 and a second spring hook 44 is provided on the spring support 14. Spring hooks 42, 44 face each other. A tension spring 46 extends between the hooks 42, 44 and at its ends is connected to the hooks 42, 44. Spring 46 may be a length of rubber tubing that when stretched will store spring energy. The function of spring 46 will be hereinafter described.

The spin hooks 20 are positively driven by a drive mechanism that is either manually operated, such as a hard crank, or through a motorized mechanism such as schematically disclosed by FIG. 3. Motorized drive mechanism 48 includes an electric motor 50 that is connected to a first pulley 52. Pulley 52 is connected to a second larger pulley 54 by a drive belt 56. Another small pulley 56 is connected to pulley 54, to rotate about a common axes. Pulley 56 is connected to pulley 58 by a drive belt 60. Another small pulley 62 is connected to pulley 58, to rotate about a common axes. Pulley 62 is connected to pulley 64 by a drive belt 66. Pulley 64 is coupled to a gear 68. Gear 68 is one of a number of identical gears 68, 70, 72, 74, 76 which mesh together at their peripheries. There is one gear like gear 68 for each pair of spin hooks 20. There is a small pair of hook gears associated with each gear 68, 70, 72, 74, 76. Hook gears 78, 80 are associated with large gear 68. Hook gears 82, 84 are associated with large gear 70. Hook gears 86, 88 are associated with large gear 72. Hook gears 90, 92 are associated with large gear 74. FIG. 3 includes a partial view of another large gear 76 and a hook gear 94 associated with it. The centers of pulley 64 and gear 68 are coupled together. However, the result would be the same regardless of which large gear is coupled to the pulley 64, to be driven by it.

The pulleys 52, 54, 58, 62, 64 and belts 55, 60, 62 provide a speed reduction transmission from motor 50 to pulley 64. Pulley 64 drives gear 68 which in turn drives gears 70, 72, 74, 76. These gears 68, 70, 72, 74, 76 drive gears 78, 80, 82, 84, 86, 88, 90, 92, 94. These gears include arrows indicating the direction of rotation. In FIG. 3, the hook pairs are designated A, B, C, D. Each hook pair is rotated in the same direction. Spin hooks 20 of pair A are rotated counterclockwise. Spin hooks 20 of pair B are rotated clockwise. Spin hooks 20 of pair C are rotated counterclockwise. Spin hooks 20 of pair D are rotated clockwise.

When the power is off, the gearing, belts and pulleys hold the spin hooks 20 against rotation. Drive motor 50 may be a variable speed reversible motor. Speed control is important to the performance of the apparatus.

Referring to FIG. 4, hook 20C, which is one of the C pair of hooks 20, is shown to have an elongated shaft 96 that extends through a pair of bearings 98, 100. Bearings 98, 100 support shaft 96 for rotation relative to the spin hook support 12. Bearing 98 is received within a bearing retainer 102. Bearing 100 is received within a bearing retainer 104. Tubular end portions of the bearing retainers 102, 104 are received within opposite end portions of an opening 106 that extends through an upper portion of the spin hook support 12. Radial flanges 108, 110 at the outer ends of the bearing retainers 102, 104 contact outer surface portions of the spin hook support 12 and limit the movement of the bearing retainers 102, 104 into the opening 106. Gear 78 is connected to an outer end portion of shaft 96 by a set screw 112. At the opposite end of the spin hook support 12, a collar 114 is connected to the spin hook shaft 96 by a set screw 116. The gear 78 and collar 114 function as stops to prevent endwise movement of the spin hook 20C relative to support 12. The other spin hooks 20 are mounted in the same way. Drive gear 68 includes a support shaft 118 to which it is connected. Shaft 118 extends through a collar 120, a pair of bearings 122, 124, a washer or spacer 126, gear 68 and a collar 128. Collar 120 is connected to shaft 118 by a set screw 130. Collar 128 is connected to shaft 118 by a set screw 132. Bearing 122 is within a bearing retainer 134 having a flange 136 at its outer end. In similar fashion, bearing 124 is within a bearing retainer 138 having a radial flange 140 at its outer end. The flanges 136, 140 bear against the opposite outer surfaces of the spin hook support 12 and limit movement of the bearing retainers into opening 141. Washer 126 performs a spacer function. Gear 78 has gear teeth 142 on its outer periphery which mesh with gear teeth 144 on the outer periphery of gear 68. The other large gears 70, 72, 74, 76, etc. are supported for rotation in this same manner as gear 68.

Referring to FIG. 5, each anchor hook 26 has an elongated shaft 146 that is supported for rotation in substantially the same manner as spin hook shaft 96 and gear shaft 118. The anchor hook shaft 146 extends through a sleeve 148 that is secured to it. Sleeve 148 is in turn secured to a fly wheel 150. Anchor hook shaft 146 also extends through a bearing 152 within a bearing retainer 154 and a bearing 156 within a bearing retainer 158. Bearing retainers 154, 158 include radial flanges 160, 162 at their outer ends. The bearing flanges press against the opposite outer surfaces of the anchor hook support 20. Tubular inner portions of the bearing retainers 154, 158 extend into an opening 164 that is formed in the anchor hook support 22. A collar 166 is connected to the end of anchor hook shaft 146, opposite the anchor hook 26, by a set screw 168. Fly wheel 150 includes an axial opening 170 spaced radially outwardly from the axis of rotation of the anchor hook shaft 146. An opening 172 is formed in anchor hook support 22, in a position to be in axial alignment with the opening 170 when the fly wheel 150 is properly positioned. A lock pin 174 is insertable into opening 172, from the side of anchor hook support 22 opposite the fly wheel 150. As shown in FIG. 5, when fly wheel 150 is positioned to place opening 170 into axial alignment with opening 172, the lock pin 174 may be moved forwardly into the opening 170. When lock pin 174 is within opening 170, the fly wheel 150 and its anchor hooks are locked against rotation. As will hereinafter be explained in more detail, the lock pin 174 is used to lock the anchor hook 26 against rotation when thread is being strung onto the spin hooks and the anchor hooks. When the power is off, the spin hooks are held against rotation by the system of pulleys, belts and gears, as previously explained.

Figure 6:
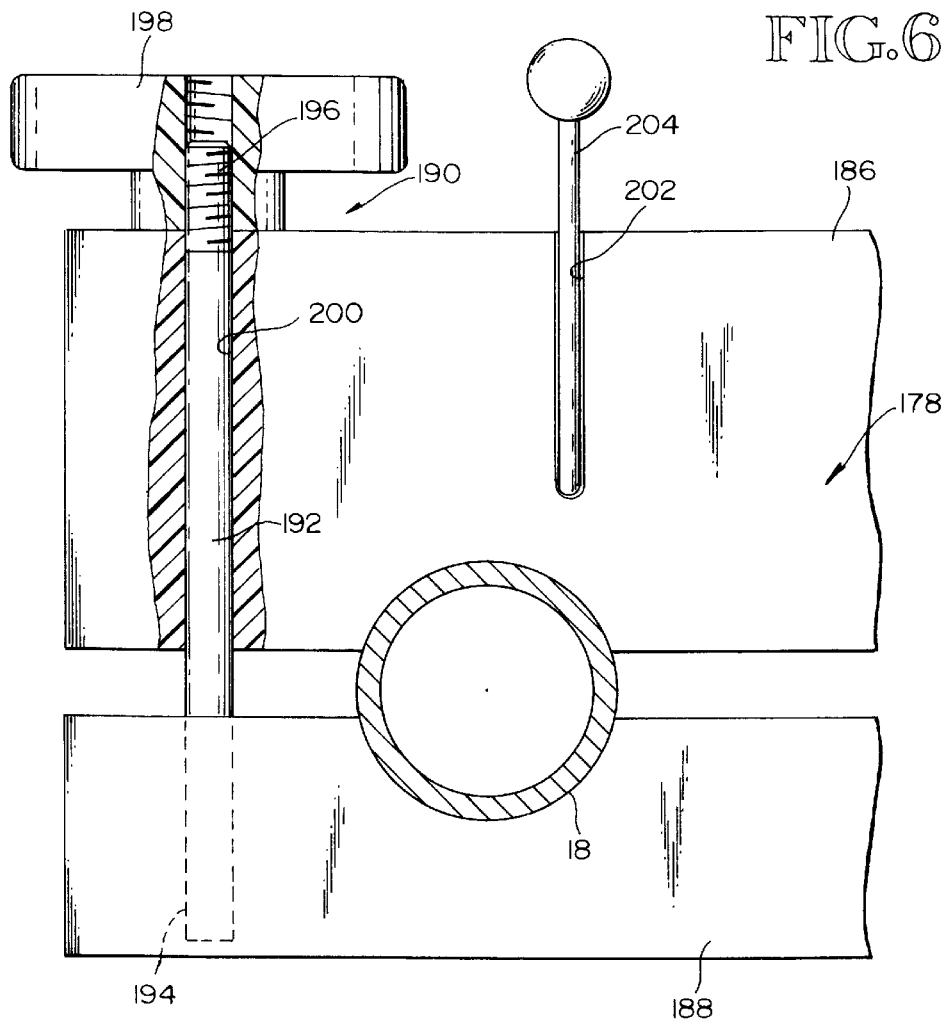
FIG. 6 is a fragmentary sectional view taken substantially along line 6—6 of FIG. 1.

At least two loop-pin supports 176, 178 are provided between the spin hook support 12 and the anchor hook support 22. Loop-pin support 176 has an upper portion 180, positioned above the tubes 16, 18 and a lower portion 182, positioned below the tubes 16, 18. Clamp screws 184 connect the two portions 180, 182 together and clamp them to the tubes 16, 18. Loop-pin support 178 also has an upper portion 186 above the tubes 16, 18 and a lower portion 188 below the tubes 16, 18. Clamp screws 190 connect the two portions 186, 188 together, and clamp them to the tubes 16, 18. Clamp screws 184, 190 are identical and so only one will be described. Referring to FIG. 6, the clamp screw 190 includes a screw portion 192 that extends vertically. It includes a lower portion 194 that is anchored within member 188. The upper end of screw portion 192 projects upwardly from member 188 and is threaded at 196. The threads receive a clamp nut 198. When members 186, 188 are assembled above and below the tubes 16, 18, and screw portion 192 is within opening 200, the threaded portion 196 is above member 186. Clamp nut 198 is threaded onto the threaded portion 196 and is rotated, making it move downwardly against member 186 so as to clamp tubes 16, 18 between members 186, 188.

Each loop-pin support 176, 178 includes a plurality of vertically extending loop-pin openings 202, one for each anchor hook 26. A loop-pin 204 is removably securable within each loop-pin opening 202. As shown by FIG. 1, the loop-pin openings 202 in loop-pin support 176 are generally in line with one of the spin hooks 20 of a pair and the related anchor hook 26. The loop-pin openings 202 in the loop-pin support 178 are substantially in line with second spin hook of the pair and the same anchor hook 26.

The use of the furling apparatus will now be described with reference to FIGS. 10 and 11. These FIGS. show one pair of spin hooks SHA, SHB and the related anchor hook AH. In FIG. 10, the hook pins 204 are in place. The hook pin that is generally in line with spin hook SHA and anchor hook AH is designated TP. This is because it is closest to what will become the tip end of the leader. The loop-pin that is generally axially in line between the second spin hook SHB and the anchor hook AH is designated BP. This is because it is closest to what will become the butt end of the leader.

The anchor hook support 22 is positioned an appropriate distance from spin hook support 12 to provide the desired length of the leader. Clamp hook support 28 is installed on the tubes 16, 18 and is moved up against the anchor hook support 22, so as to move the screw clamps 38, 40 relatively through the openings 36. When the clamp nuts 40 are on the side of clamp base 28 opposite the anchor hook support 22, the clamp nuts 34 are tightened to connect the clamp base 28 to the tubes 16, 18. The clamp nuts 40 are rotated until the anchor hook support 22 is secured to the clamp hook base 28. Then, the spring 46 is connected between hooks 42, 44. In the process, spring 46 is put into tension. Then, the lock-pins 174 are inserted to lock the anchor hooks 26 against rotation, if this has not already been done. The loop-pins 204 are inserted if this has not already been done. Now the apparatus is ready to receive the thread. The term "thread" may be any filament. By way of non-limiting example, the thread may be any known fishing line material, such as a polymeric monofilament, steel wire, or nylon thread, or the thread may be of any other filament material such as "KEVLAR."

Referring to FIG. 10, one end of the thread is attached to spin hook SHA. The thread is then strung to and around pin TP and back to and around spin hook SHA. Then it is again strung from hook SHA to and around pin TP and brought back to and around spin hook SHA. The thread then is strung from spin hook SHA to and around anchor hook AH and then on to and around pin BP. From pin BP, it is strung back to and around anchor hook AH and on to pin TP. At pin TP, it is inserted through the two loops L1, L2 previously formed at pin TP to form a loop L3. See FIG. 3. It is then strung back around anchor hook AH and on to and around hook SHB. It is next strung from spin hook SHB to pin BP. At pin BP it is inserted through the loop L4 to form loop L5. It is next strung back to and around spin hook SHB. From spin hook SHB it is strung back to and through loop L4 to form loop L6. Next, it is strung back to and around spin hook SHB, then on to and around anchor hook AH, and then on to spin hook SHA. It is tied or otherwise secured to spin hook SHA.

Instead of tying the thread off at spin hook SHA, the thread may merely be looped around spin hook SA and then led to and around the spin hook SHA of the next pair of spin hooks. The above stringing procedure is then repeated with the second pair of spin hooks 20 and their anchor hook 26. The procedure is repeated entirely across the furling apparatus. The thread is pulled to put it in tension as it is threaded around the hooks and pins. The first threading tends to pull the first anchor AH and its end of the anchor hook support 22 towards the spin hook support 12. The sleeve bearings 24 and the tubes 16, 18 brace the anchor hook support 22 so that the tension force will not angle the support 22 into a position that is not perpendicular to the tubes 16, 18. In other words, the engagement of the sleeve bearings 24 with the tubes 16, 1 8 maintains anchor hook support 22 substantially perpendicular with the tubes 16, 18 as the thread is being strung on the hooks and pins.

FIG. 11 is a view like FIG. 10 but with the loop pins TP, BP removed. These pins TP, BP can be removed without the thread pattern losing its shape because loop L3 engages loops L1, L2 and loop L4 engages loops L5, L6.

FIG. 11 is labeled to show what results from the pattern of thread stringing that has just been described. Two thread groups have been formed. The first thread group extends from spring hook SHA to anchor hook AH. The second thread group extends from spin hook SHB to anchor hook AH. In FIG. 11, the thread pattern is divided into "butt", "mid" and "tip" sections. The thread strands in each section are numbered. The "butt" section is shown to include twelve thread strands. The "mid" section is shown to include ten thread strands. The "tip" section is shown to include eight thread strands. It is this pattern of thread strands that results in the finished leader having a tapered form. There are several ways of changing the number of thread strands per section. Firstly, the last threading of the thread from spin hook SHB to and around anchor hook AH and on to spin hook SHA could be omitted. This would mean that the thread would have to be tied to spin hook SHB. This would eliminate two thread strands per section. It would result in the "butt" section including ten strands, the "mid" section including eight strands and the "tip" section including six strands. Another way of changing the number of thread strands per section would be to thread two or more threads together. For example, the ends of two separate threads could be tied to spin hook SHA. Then, these two threads can be threaded together to and around the pins and hooks in the manner described above, with the threading being finished by connecting the two threads to the spin hook SHA. This would result in twenty-four thread strands in the "butt" section, twenty thread strands in the "mid" section and sixteen thread strands in the "tip" section. This embodiment may be further changed by using two different threads, i.e. threads having different characteristics. For example, one thread may be made from a heavy material so as to add weight to the leader. Another way of changing the pattern and number of thread strands would be to use additional loop pins. For example, three loop pins could be used instead of two. This would require a different thread pattern so that a desired taper would be produced.

After the threading is completed, the "furling" operation is performed. The clamp nuts 40 are loosened and aligned with the openings 36, enabling the anchor hook support 22 to move away from the clamp base 28, but subject to the force of spring 46. Spring 46 will bias the anchor hook support 22 away from the drive hook support 12, maintaining tension in the thread strands. Next, the motor 50 is energized so that the motor, belts, pulleys and gears will spin the spin hooks 20. Alternatively, a manual crank is used to spin hooks 20. As previously stated, each pair of spin hooks is spun in the same direction. Each is spun at the same rate of speed. Looking to FIG. 11, for example, let it be assumed that spin hooks SHA and SHB are both rotated in the clockwise direction. This will cause the two thread groups to be twisted in the same direction. The twisting will cause a shortening of the thread groups. In response to this shortening, the anchor hook AH will be pulled towards the spin hook support 12. This movement will occur because anchor hook support 22 is free to slide along the tubes 16, 18. The spring 46 will want to hold it back, but the shortening of the thread groups will exert a force on the anchor hook support 22 in opposition to the spring force. The spring 46 will be stretched, and as it stretches the anchor hook support, the anchor hooks 26 will move towards the spin hook support 12 and the spin hooks 20. After the two thread groups have been separately twisted a sufficient amount, the power is turned off. Then, the lock pins 174 are removed. Starting from the anchor hook end, the two thread groups are guided laterally inwardly towards each other and the anchor hooks are allowed to rotate freely. As the anchor hook 26 rotates, the fly wheels 150 tend to even out the rotation. The two thread groups that were separately twisted in one direction will now twist together in the opposite direction, forming a single twisted line that is tapered. It is tapered because it has, for example, twelve strands in its "butt" section, ten strands in its "mid" section, and only eight strands in its "tip" section.

After the thread groups have become a single line that extends from the anchor hooks 26 to locations close to the spin hooks 20, the two ends of each line are formed into loops. There is already a loop 228 at the anchor hook end of each line. What is necessary at that end is to bind the line at the base of the loop to prevent the line from unwinding. This can be done by applying glue to the line at the base of the loop 230 (FIG. 13). A binding thread 232 may be wrapped around the line in the glue so that the glue will firmly connect the binding thread to the line. At the opposite or spin hook end of the line, a side loop 234 is formed in the line, as shown by FIG. 14. A thread 236 is wrapped around the base of this loop and glue is applied to the thread at 238 and the base of the loop, so as to connect the thread to the line. After the glue has sufficiently dried, the line is cut at 240 between the loop and the spin hooks. Additional thread and glue may be applied for the purpose of covering the cut end of the line.

The illustrated embodiments are only examples of the present invention and, therefore, are non-limitive. It to be understood than many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. Apparatus for making a tapered line from thread, comprising:

a base;

a spin hook support on said base;

at least one pair of adjacent spin hooks on said spin hook support, mounted for rotation about parallel, generally horizontal axes;

a drive mechanism connected to rotate the at least two spin hooks for simultaneous, and substantially same-direction, same-rate rotation;

an anchor hook support on said base spaced longitudinally from the spin hook support;

an anchor hook on said anchor hook support, mounted for rotation about an axis that is parallel to the axes of rotation of the two spin hooks;

said anchor hook facing the two spin hooks, and said spin hooks and said anchor hook forming the three corners of a triangle;

a releasable lock for locking the anchor hook against rotation relative to the anchor hook support, said lock having a lock position in which it engages the anchor hook and holds it against rotation, and a release position in which it allows the anchor hook to rotate freely about its axis of rotation;

at least two loop-pin supports, wherein a first loop-pin support base is connected to the base and spaced longitudinally from the spin hook support towards the anchor hook support, and a second loop-pin support is connected to said base and positioned longitudinally between the spin hook support and the first loop-pin support;

a first thread engaging loop-pin;

a second thread engaging loop-pin;

said first thread engaging loop-pin being removably mounted on the first loop-pin support, generally in line between a first of said pair of spin hooks and the anchor hook;

said second thread engaging loop-pin being removably mounted on the second loop-pin support, generally in line between the second spin hook and the anchor hook;

said anchor hook support being mounted on the base for longitudinal movement towards and away from the spin hook support; and a spring connected to the base and the anchor hook support and positioned to in use exert a resilient force on the anchor hook support, for biasing it away from the spin hook support, said anchor hook support being movable on said base longitudinally towards the spin hook support, against the force of said spring.

2. Apparatus according to claim 1, wherein the drive mechanism is a power driven mechanism.

3. Apparatus according to claim 1, comprising a plurality of pairs of spin hooks on said spin hook support, and a plurality of anchor hooks on the anchor hook support, one for each pair of spin hooks, each pair of spin hooks and the associated anchor hook forming the corners of a triangle.

4. Apparatus according to claim 1, wherein said base includes a pair of laterally spaced apart tracks, said anchor hook support is mounted on said tracks for said longitudinal movement towards and away from the spin hook support, and said first and second loop-pin supports are adjustably affixable in longitudinal position on the tracks.

5. Apparatus according to claim 4, comprising a plurality of pairs of spin hooks on said spin hook support, and a plurality of anchor hooks on the anchor hook support, one for each pair of spin hooks, each pair of spin hooks and the associated anchor hook forming the corners of a triangle.

6. Apparatus according to claim 4, wherein the tracks are tubes and the first and second loop-pin supports include clamps for clamping them to said tubes.

7. Apparatus according to claim 6, comprising a plurality of pairs of spin hooks on said spin hook support, and a plurality of anchor hooks on the anchor hook support, one for each pair of spin hooks, each pair of spin hooks and the associated anchor hook forming the corners of a triangle.

8. Apparatus according to claim 1, further comprising a releasable lock for said anchor hook support having a lock position in which the anchor hook support is locked in position relative to the spin hook support and a release position in which the anchor hook support is free to move longitudinally towards and away from the spin hook support.

9. Apparatus according to claim 8, comprising a plurality of pairs of spin hooks on said spin hook support, and a plurality of anchor hooks on the anchor hook support, one for each pair of spin hooks, each pair of spin hooks and the associated anchor hook forming the corners of a triangle.

10. Apparatus according to claim 9, wherein said base includes a pair of laterally spaced apart tracks, said anchor hook support is mounted on said tracks for said longitudinal movement towards and away from the spin hook support, and said first and second loop-pin supports are adjustably affixable in longitudinal position on the tracks.

11. Apparatus according to claim 10, wherein the tracks are tubes and the first and second loop-pin supports include clamps for clamping them to said tubes.

12. Apparatus according to claim 11, wherein the releasable lock for said anchor hook support includes a clamp base mounted on said tubes, and including clamps for clamping such clamp base onto said tubes, and additional clamps carried by one of said clamp base and said anchor hook support for clamping the anchor hook support to the clamp base when the clamp base is clamped to the tubes, to in that manner lock the anchor hook support in position relative to the spin hook support.

13. Apparatus according to claim 8, wherein said base includes a pair of laterally spaced apart tracks, said anchor hook support is mounted on said tracks for said longitudinal movement towards and away from the spin hook support, and said first and second loop-pin supports are adjustably affixable in longitudinal position on the tracks.

14. Apparatus according to claim 13, wherein the tracks are tubes and the first and second loop-pin supports include clamps for clamping them to said tubes.

15. Apparatus according to claim 14, wherein the releasable lock for said anchor hook support includes a clamp base mounted on said tubes, and including clamps for clamping such clamp base onto said tubes, and additional clamps carried by one of said clamp base and said anchor hook support for clamping the anchor hook support to the clamp base when the clamp base is clamped to the tubes, to in that manner lock the anchor hook support in position relative to the spin hook support.

16. A method of making a tapered line from thread, comprising:

providing a pair of spin hooks;

positioning said spin hooks side-by-side, but spaced apart laterally and directed in a common direction;

mounting said spin hooks against longitudinal movement, but for rotation about parallel, horizontal axis;

providing an anchor hook;

positioning the anchor hook longitudinally away from, but directed towards the spin hooks;

mounting said anchor hook for guided longitudinal movement and for free rotation about a horizontal axis which is parallel to the axes of rotation of the spin hooks;

providing a first loop-pin;

mounting said first loop-pin in a fixed position longitudinally between a first of said spin hooks and the anchor hook;

providing a second loop-pin;

mounting said second loop-pin in a fixed position longitudinally between a second of said spin hooks and the anchor hook, and spaced longitudinally from the first loop-pin;

stringing thread back and forth between the spin hooks and the anchor hook and around the loop-pins, to form a first thread group extending between the first spin hook and the anchor hook, and around the first loop-pin, and a second thread group extending between the second spin hook and the anchor hook and around the second loop-pin, said first thread group including interconnected loops of thread joined at the first loop-pin, said second thread group including interconnected loops of thread joined at the second loop-pin, and said thread groups providing a first number of thread strands in the thread extent between the spin hooks and the loop-pin closest to the spin hooks, a second, smaller number of thread strands in the thread extent between the two loop-pins, and a third, yet smaller number of thread strands in the thread extend between the loop-pin closest to the anchor hook and the anchor hook;

following the stringing, removing said loop-pins;

applying a spring force to the anchor hook to bias the anchor hook away from the spin hooks and tension the thread;

separately twisting the two thread groups in the same direction to separately twist the two thread groups, and cause the thread groups to be shortened by the twisting and to pull on the anchor hook and move it towards the spin hooks in opposition to the spring force;

following the separate twisting of the two thread groups, bringing the two thread groups laterally together while maintaining tension and allowing the anchor hook to spin so that the two thread groups will twist and wind together into a single line;

securing the twisted thread strands together at the anchor hook end of the line, to hold the twist;

forming an end loop at the anchor hook end of the line;

securing the twisted thread strands together at the spin hook end of the line, to prevent unwinding; and forming an end loop at said spin hook end of the line.

17. The method of claim 16, wherein said stringing step included stringing the thread to form two loops extending between the first spin hook and the first loop-pin, two loops extending between the second spin hook and the second loop-pin, two strands extending from the first spin hook to and around the anchor hook and then to the second spin hook, and a loop engaging the first two loops at the location of the first loop-pin and extending around the anchor hook and engaging the second two loops at the second loop-pin.

18. A furled line made from the method of claim 17.

19. A furled line made from the method of claim 16.

* * * * *